(12) United States Patent
Jacobs et al.

(10) Patent No.: US 9,141,888 B2
(45) Date of Patent: Sep. 22, 2015

(54) METHOD AND APPARATUS FOR GENERATING LABELS

(71) Applicant: SANFORD, L.P., Oak Brook, IL (US)

(72) Inventors: Ron Jacobs, Acworth, GA (US); Stephen Charles Gohde, Atlanta, GA (US); Stephen Spencer, Atlanta, GA (US); Bram Boot, Borgerhout (BE); Latha Airodi, Suwanee, GA (US); Nancy Elaine Taylor, Lawrenceville, GA (US); David G. Nesfeder, Jr., Gainesville, GA (US)

(73) Assignee: SANFORD, L.P., Downers Grove, IL (US)

( * ) Notice: Subject to any disclaimer, the term of this patent is extended or adjusted under 35 U.S.C. 154(b) by 0 days.

(21) Appl. No.: 14/213,081

(22) Filed: Mar. 14, 2014

(65) Prior Publication Data
US 2014/0268190 A1     Sep. 18, 2014

Related U.S. Application Data

(60) Provisional application No. 61/788,275, filed on Mar. 15, 2013.

(51) Int. Cl.
*G06F 3/12* (2006.01)
*G06K 15/02* (2006.01)

(52) U.S. Cl.
CPC ............ *G06K 15/024* (2013.01); *G06F 3/1206* (2013.01); *G06F 3/1253* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2006/0082816 A1* | 4/2006 | Daniel et al. | 358/1.15 |
| 2006/0114487 A1* | 6/2006 | Caveney et al. | 358/1.13 |
| 2008/0007781 A1* | 1/2008 | Oike et al. | 358/1.16 |

OTHER PUBLICATIONS

International Search Report for Application No. PCT/EP2014/055096 dated Jun. 10, 2014.
Written Opinion for International Application No. PCT/EP2014/055096 dated Jun. 10, 2014.

* cited by examiner

*Primary Examiner* — Jeremiah Bryar
(74) *Attorney, Agent, or Firm* — Marshall, Gerstein & Borun LLP

(57) ABSTRACT

A method including selecting a type of label to be printed, inputting information for the label to be printed, wherein the information includes label data defining content of an image to be printed, and parameter data defining at least one parameter of the label to be printed, saving the information for the label to be printed as a file in a memory, and providing the file with a file extension name indicative of the type of label.

27 Claims, 7 Drawing Sheets

METHOD AND APPARATUS FOR GENERATING LABELS

CROSS-REFERENCE TO RELATED APPLICATION

This application claims the benefit of the filing date of U.S. Provisional Appl. No. 61/788,275, filed Mar. 15, 2013. U.S. Provisional Appl. No. 61/788,275 is hereby incorporated by reference.

FIELD OF THE DISCLOSURE

The present disclosure relates to the preparation of labels to be printed. More particularly it relates to the saving of label files for labels to be printed.

BACKGROUND

Known label printing apparatuses are disclosed in EP-A-322918 and EP-A-322919 (Brother Kogyo Kabushiki Kaisha) and EP-A-267890 (Varitronic). The label printing apparatuses each include a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

In other known tape printing apparatuses, so-called direct thermal tapes are used, in which an image is created directly onto the direct thermal tape without the interposition of an ink ribbon cassette. Elements of a print head are heated, and the heat causes chemicals within the direct thermal tape to react and produce an image in or on the tape.

The apparatuses of the type described above are provided with a keyboard which enables a user to enter characters, symbols and the like to form an image to be printed by the tape printer. The keyboard usually has text character keys and number keys for entering letters and numbers respectively, plus some function keys which, among other things, operate menus and allow printing attributes to be set.

"Stand-alone" label printers can be distinguished from "label printer systems", which comprise a printer connected to a PC or other computing device. In such label printer systems, a user creates or edits a label for printing using a PC, and then sends print data to a printer to cause the printer to print the print data onto a label medium. In such label printer systems, the user will view a display of the PC to create a label, rather than a display of the printer. Also, the label-editing software used for creating the label will be stored and run on the PC, rather than the printer.

In contrast, stand-alone label printers are operable independently of a PC or other computer to create and print a label. Although some stand-alone printers are connectable to a PC or other computer to receive some data, they are nevertheless operable independently of the PC or other computer to create a label for printing, since label-editing software used for creating the label is stored and run on the label printer itself. Stand-alone label printers thus usually include an integral display via which the user can view an interface of the label-editing software.

SUMMARY OF THE DISCLOSURE

In a first aspect there is provided a method comprising: selecting a type of label to be printed; inputting information for said label to be printed, wherein said information comprises label data defining content of an image to be printed, and parameter data defining at least one parameter of the label to be printed; saving said information for said label to be printed as a file in a memory, and providing said file with a file extension name indicative of the type of label.

Preferably said method comprises transferring said file between a first device and a second device.

Preferably said first device comprises one of a label printer and a PC, and said second device comprises one of a label printer and a PC.

Preferably said method comprises maintaining said file extension name when transferring said file between said first device and said second device.

Preferably said method comprises opening said file on said second device, and displaying to a user an image of a label in accordance with said saved information.

Preferably the method comprises providing a user with an option to link data from an external file with said saved file.

Preferably the method comprises synchronising the external file with the saved file.

Preferably said file is saved as an XML file.

Preferably said type of label comprises one of: a general label; a cable wrap label; a 110-block label; a patch panel label; a horizontal breaker label; an asset tracking label; a heat shrink label; an arc flash label; a quick label; a flag label; a distribution panel label; a terminal block label; a vertical breaker label; a pipe marking label; a self laminating cable wrap label; a right-to-know label.

Preferably said label data comprises alphanumeric character data.

Preferably said label data comprises bar-code data.

Preferably said parameter information comprises one or more of: information regarding a specific cassette used; label layout information; print settings information; label formatting information.

Preferably said label layout information comprises information defining the relative positions of parts of the image to be printed.

Preferably said print settings information comprises one or more of collating sequence information; mirrored setting information; cutting information; number of labels.

Preferably said label formatting information comprises one or more of: font size; font style; horizontal alignment; vertical alignment.

In a further aspect there is provided a computer program comprising computer program code means adapted to perform the method described above when said program is run on a computer.

In a further aspect there is provided an apparatus comprising: at least one selector for enabling a user to select a type of label to be printed, and for enabling a user to input information for said label to be printed, wherein said information comprises label data defining content of an image to be printed, and parameter data defining at least one parameter of the label to be printed; a memory for saving said information for said label to be printed as a file; the apparatus configured to provide said file with a file extension name indicative of the type of label.

Preferably said apparatus is configured to transfer said file to a second device.

Preferably said apparatus comprises one of a label printer and a PC, and said second device comprises one of a label printer and a PC.

Preferably said apparatus is configured to maintain said file extension name when transferring said file between said first device and said second device.

Preferably said second device comprises a display, said second device configured to display to a user an image of a label in accordance with said saved information when said file is opened on said second device.

Preferably the apparatus is configured to provide a user with an option to link data from an external file with said saved file.

Preferably the apparatus is configured to synchronise the external file with the saved file.

Preferably said apparatus is configured to save said file as an XML file.

Preferably said type of label comprises one of: a general label; a cable wrap label; a 110-block label; a patch panel label; a horizontal breaker label; an asset tracking label; a heat shrink label; an arc flash label; a quick label; a flag label; a distribution panel label; a terminal block label; a vertical breaker label; a pipe marking label; a self-laminating cable wrap label; a right-to-know label.

Preferably said label data comprises alphanumeric character data.

Preferably said label data comprises bar-code data.

Preferably said parameter information comprises one or more of: information regarding a specific cassette used; label layout information; print settings information; label formatting information.

Preferably said label layout information comprises information defining the relative positions of parts of the image to be printed.

Preferably said print settings information comprises one or more of collating sequence information; mirrored setting information; cutting information; number of labels.

Preferably said label formatting information comprises one or more of: font size; font style; horizontal alignment; vertical alignment.

In a further aspect there is provided an apparatus comprising means for selecting a type of label to be printed, and means for inputting information for said label to be printed, wherein said information comprises label data defining content of an image to be printed, and parameter data defining at least one parameter of the label to be printed; memory means for saving said information for said label to be printed as a file; and means for providing said file with a file extension name indicative of the type of label.

Preferably said apparatus comprises means for transferring said file to a second device.

Preferably said apparatus comprises one of a label printer and a PC, and said second device comprises one of a label printer and a PC.

Preferably said apparatus comprises means for maintaining said file extension name when transferring said file between said first device and said second device.

Preferably said second device comprises display means, said second device configured to display to a user an image of a label in accordance with said saved information when said file is opened on said second device.

Preferably said apparatus comprises means for providing a user with an option to link data from an external file with said saved file.

Preferably the apparatus comprises means for synchronising the external file with the saved file.

Preferably said apparatus comprises means for saving said file as an XML file.

Preferably said type of label comprises one of: a general label; a cable wrap label; a 110-block label; a patch panel label; a horizontal breaker label; an asset tracking label; a heat shrink label; an arc flash label; a quick label; a flag label; a distribution panel label; a terminal block label; a vertical breaker label; a pipe marking label; a self-laminating cable wrap label; a right-to-know label.

Preferably said label data comprises alphanumeric character data.

Preferably said label data comprises bar-code data.

Preferably said parameter information comprises one or more of: information regarding a specific cassette used; label layout information; print settings information; label formatting information.

Preferably said label layout information comprises information defining the relative positions of parts of the image to be printed.

Preferably said print settings information comprises one or more of collating sequence information; mirrored setting information; cutting information; number of labels.

Preferably said label formatting information comprises one or more of: font size; font style; horizontal alignment; vertical alignment.

In a further aspect there is provided a method comprising: displaying a first list of labels stored on a first device, and concurrently displaying a second list of labels stored on a second device; providing a means for transferring labels between said first device and said second device; and updating at least one of said first list and said second list in response to said transferring.

Preferably said first list is displayed adjacent said second list.

Preferably said means for transferring comprises at least one selectable icon.

Preferably said selectable icon comprises at least one arrow.

Preferably said selectable icon is displayed between said first list and said second list.

Preferably said first device comprises one of a label printer and a PC, and said second device comprises one of a label printer and a PC.

Preferably said method comprises displaying a memory usage of one or both of said first device and said second device.

In a further aspect there is provided a computer program comprising computer program code means adapted to perform the method described above when said program is run on a computer.

In a further aspect there is provided an apparatus comprising: a controller for controlling a display; the controller configured to control the display to display a first list of labels stored on said apparatus, and concurrently display a second list of labels stored on a second device; the controller configured to provide on the display a selector for transferring labels between said apparatus and said second device; and in response to said transferring labels between said apparatus and said second device, said controller configured to update at least one of said first list and said second list.

Preferably said controller is configured to display said first list adjacent said second list.

Preferably said selector comprises at least one selectable icon.

Preferably said selectable icon comprises at least one arrow.

Preferably said controller is configured to control the display to display said selectable icon between said first list and said second list.

Preferably said apparatus comprises one of a label printer and a PC, and said second device comprises one of a label printer and a PC.

Preferably said controller is configured to control the display to display a memory usage of one or both of said apparatus and said second device.

In a further aspect there is provided an apparatus comprising means for displaying a first list of labels stored on said apparatus, and concurrently displaying a second list of labels stored on a second device; means for transferring labels between said first device and said second device; and means for updating at least one of said first list and said second list in response to said transferring.

Preferably said first list is displayed adjacent said second list.

Preferably said means for transferring comprises at least one selectable icon.

Preferably said selectable icon comprises at least one arrow.

Preferably said selectable icon is displayed between said first list and said second list.

Preferably said apparatus comprises one of a label printer and a PC, and said second device comprises one of a label printer and a PC.

Preferably said apparatus comprises means for displaying a memory usage of one or both of said first device and said second device.

In a further aspect there is provided a method comprising: displaying a plurality of selectable options for a label to be printed; and providing means for enabling a user to alter a status of at least one of said options; wherein said status comprises an indication of a user preference for said at least one option.

Preferably the method comprises enabling a user to alter said status between a first status which indicates that the at least one option is a preferred option of said user, and a second status which indicates that the at least one option is not a preferred option of said user.

Preferably said plurality of selectable options are displayed in one of a list and a menu.

Preferably said plurality of selectable options are positioned in said one of a list and a menu in dependence on their status.

Preferably said means for enabling a user to alter said status comprises a selectable icon.

Preferably said method comprises enabling a user to one of select and de-select said selectable icon.

Preferably the plurality of selectable options comprises one or more of: a label type; a saved label; an image or icon to be inserted into a label.

Preferably said label type comprises one of: a general label; a cable wrap label; a 110-block label; a patch panel label; a horizontal breaker label; an asset tracking label; a heat shrink label; an arc flash label; a quick label; a flag label; a distribution panel label; a terminal block label; a vertical breaker label; a pipe marking label; a self laminating cable wrap label; a right-to-know label.

In a further aspect there is provided a computer program comprising computer program code means adapted to perform the method described above when said program is run on a computer.

In a further aspect there is provided an apparatus comprising: a controller for controlling a display; the controller configured to control the display to display a plurality of selectable options for a label to be printed; said controller configured to enable a user to alter a status of at least one of said options; wherein said status comprises an indication of a user preference for said at least one option.

Preferably the controller is configured to enable a user to alter said status between a first status which indicates that the at least one option is a preferred option of said user, and a second status which indicates that the at least one option is not a preferred option of said user.

Preferably said controller is configured to control said display to display said plurality of selectable options in one of a list and a menu.

Preferably said controller is configured to control said display to display said plurality of selectable options in said one of a list and a menu in dependence on their status.

Preferably said controller is configured to control the display to display a selectable icon for enabling a user to alter said status.

Preferably said controller is configured to enable a user to one of select and de-select said selectable icon.

Preferably the plurality of selectable options comprises one or more of: a label type; a saved label; an image or icon to be inserted into a label.

Preferably said label type comprises one of: a general label; a cable wrap label; a 110-block label; a patch panel label; a horizontal breaker label; an asset tracking label; a heat shrink label; an arc flash label; a quick label; a flag label; a distribution panel label; a terminal block label; a vertical breaker label; a pipe marking label; a self-laminating cable wrap label; a right-to-know label.

In a further aspect there is provided an apparatus comprising means for displaying a plurality of selectable options for a label to be printed; and means for enabling a user to alter a status of at least one of said options; wherein said status comprises an indication of a user preference for said at least one option.

Preferably the apparatus comprises means for enabling a user to alter said status between a first status which indicates that the at least one option is a preferred option of said user, and a second status which indicates that the at least one option is not a preferred option of said user.

Preferably said plurality of selectable options are displayed in one of a list and a menu.

Preferably said plurality of selectable options are positioned in said one of a list and a menu in dependence on their status.

Preferably said means for enabling a user to alter said status comprises a selectable icon.

Preferably said apparatus comprises means for enabling a user to one of select and de-select said selectable icon.

Preferably the plurality of selectable options comprises one or more of: a label type; a saved label; an image or icon to be inserted into a label.

Preferably said label type comprises one of: a general label; a cable wrap label; a 110-block label; a patch panel label; a horizontal breaker label; an asset tracking label; a heat shrink label; an arc flash label; a quick label; a flag label; a distribution panel label; a terminal block label; a vertical breaker label; a pipe marking label; a self-laminating cable wrap label; a right-to-know label.

DETAILED DESCRIPTION OF THE PREFERRED EMBODIMENTS

Figure 1:
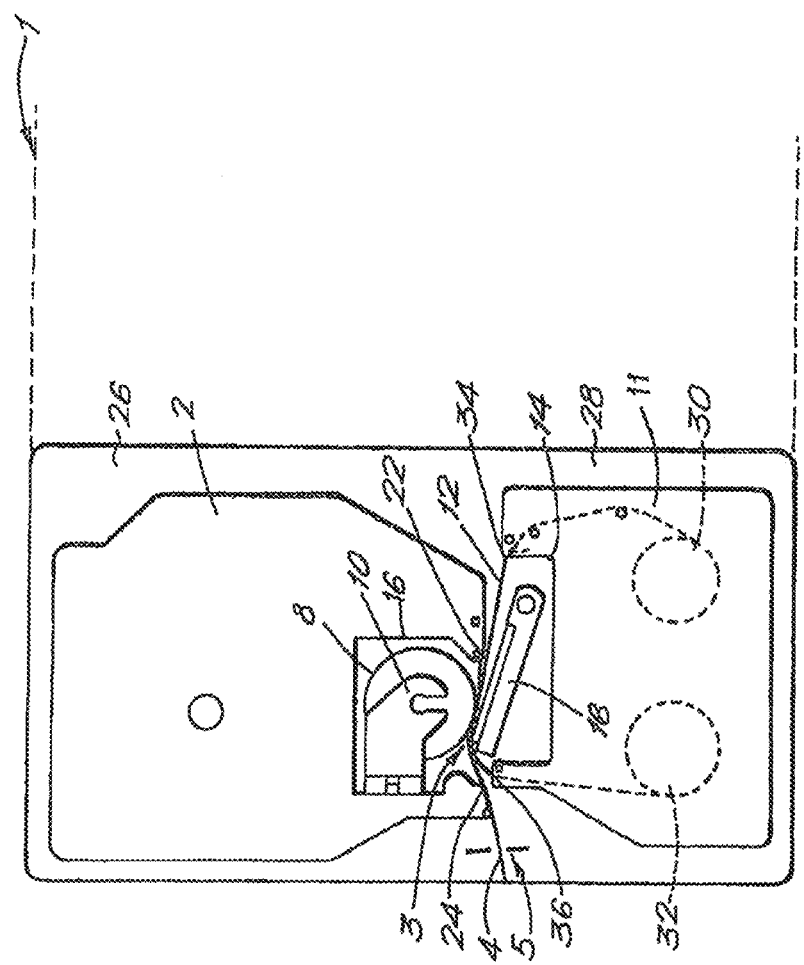
FIG. 1 is a plan view showing certain parts of one type of label printing system.

FIG. 1 shows in plan view a first label printer which has two cassettes arranged therein. Typically, this label printer 1 is powered by batteries at least part of the time. Alternatively the label printer may be mains powered.

The upper cassette is located in a first cassette receiving portion 26 and contains a supply of image receiving tape 4 which passes through a print zone 3 of the label printer 1 to an outlet 5 of the label printer 1. The image receiving tape 4 comprises an upper layer for receiving a printed image on its upper surface and has its other surface coated with an adhesive layer to which is secured a releasable backing layer. The upper cassette 2 has a recess for accommodating a platen 8 of the label printer 1, and guide portions 22 and 24 for guiding the tape through a print zone 3. The platen 8 is mounted for rotation within a cage moulding 10. Alternatively the platen could be mounted for rotation on a pin.

The lower cassette 11 is located in the second cassette receiving portion 28 and contains a thermal transfer ribbon 12 which extends from the supply spool 30 to a take-up spool 32 within the cassette 11. The thermal transfer ribbon 12 extends through the print zone 3 in overlap with the image receiving tape 4. The cassette 11 has recess 14 for receiving a print head 18 of the label printer 1 and guide portions 34 and 36 for guiding the thermal transfer ribbon 12 through the print zone 3. Print head 18 is moveable between an operative position shown in FIG. 1, in which it is in contact with the platen 8 and holds the thermal transfer ribbon 12 and the image receiving tape 4 in overlap between a print head 18 and the platen 8, and an inoperative position in which it is moved away from the platen 8 to release thermal transfer ribbon 12 and image receiving tape 4. In the operative position, the platen 8 is rotated to cause the image receiving tape 12 to be driven past print head 18 and the print head 18 is controlled to print an image on the image receiving tape 4 by thermal transfer of ink from the ribbon 12. Each of the printing elements on the print head 18 is activatable separately and is activated in accordance with the desired image to be printed. The label printer 1 has a lid (which is not shown) which is hinged along the rear of the cassette receiving portions 26 and 28 and which covers both cassettes when in place.

A DC motor 7 (see FIG. 3) continuously drives the platen 8. The platen is arranged to drive the image receiving tape 4 through the print zone 3 by the actuation of its own rotation. In other embodiments, transport of the image receiving tape across the print head can be done by other means, such as by a separate driven roller of the printer or of the cassette, or by a pair of cooperating rollers positioned on opposite sides of the tape, or by other means.

The image is printed by the print head 18 on the image receiving tape on a column by column basis with the columns being adjacent one another in the direction of movement of the tape 4.

Figure 2:
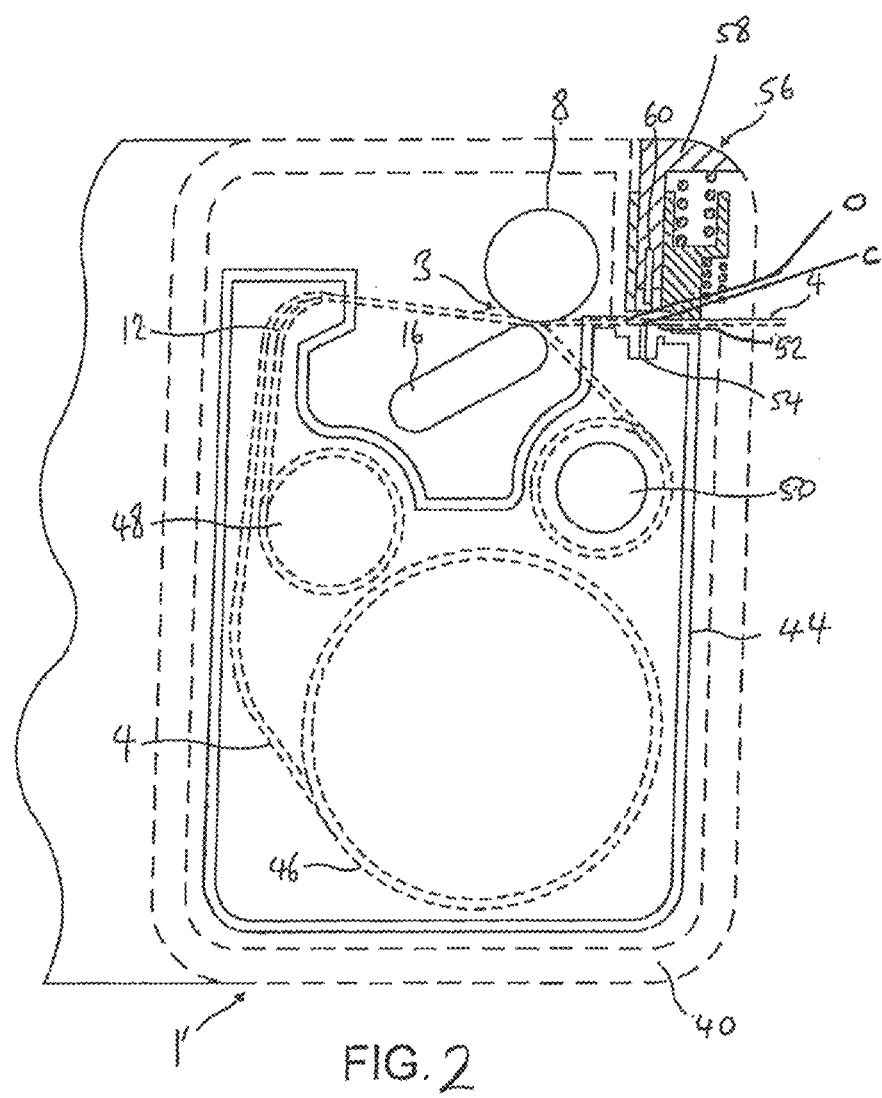
FIG. 2 is a plan view showing certain parts of another type of label printing system.

FIG. 2 illustrates in plan view a cassette bay of a second label printer 1' which uses a one cassette system. Like reference numerals are used for those parts which are also shown in FIG. 1. The cassette bay is shown by the dotted line 40. The cassette bay 40 includes a thermal print head 18 and a platen 8 which cooperate to define a print zone 3.

The print head 18 is pivotable about a pivot point so that it can be brought into contact with the platen 8 for printing and moved away from the platen 8 to enable the cassette to be removed and replaced as in the first embodiment. Alternatively the platen is pivotable so that it can be brought into contact with the printhead for printing and moved away from the printhead to enable the cassette to be inserted. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, past the print zone 3 and out of the cassette 44 through an outlet O to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive continuously the image receiving tape through the print zone 3 during printing. In either of the embodiments, it is possible that the tape be driven in a step wise manner by a stepper motor.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 and out of the cassette 44 through an outlet O to the cutting location C where it is supported by facing wall portions on either side of the slot 54.

The second label printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

These example label printers 1 and 1' may act as standalone printing devices including a controller for receiving inputs from a user and to alter what is displayed on a display of the printing devices. Furthermore, the label printers 1 and 1' may also be connectable or connected to a PC, in which case the PC also includes a controller to receive inputs from a user and to alter what is displayed on a display of the printer or of the PC.

Figure 3:
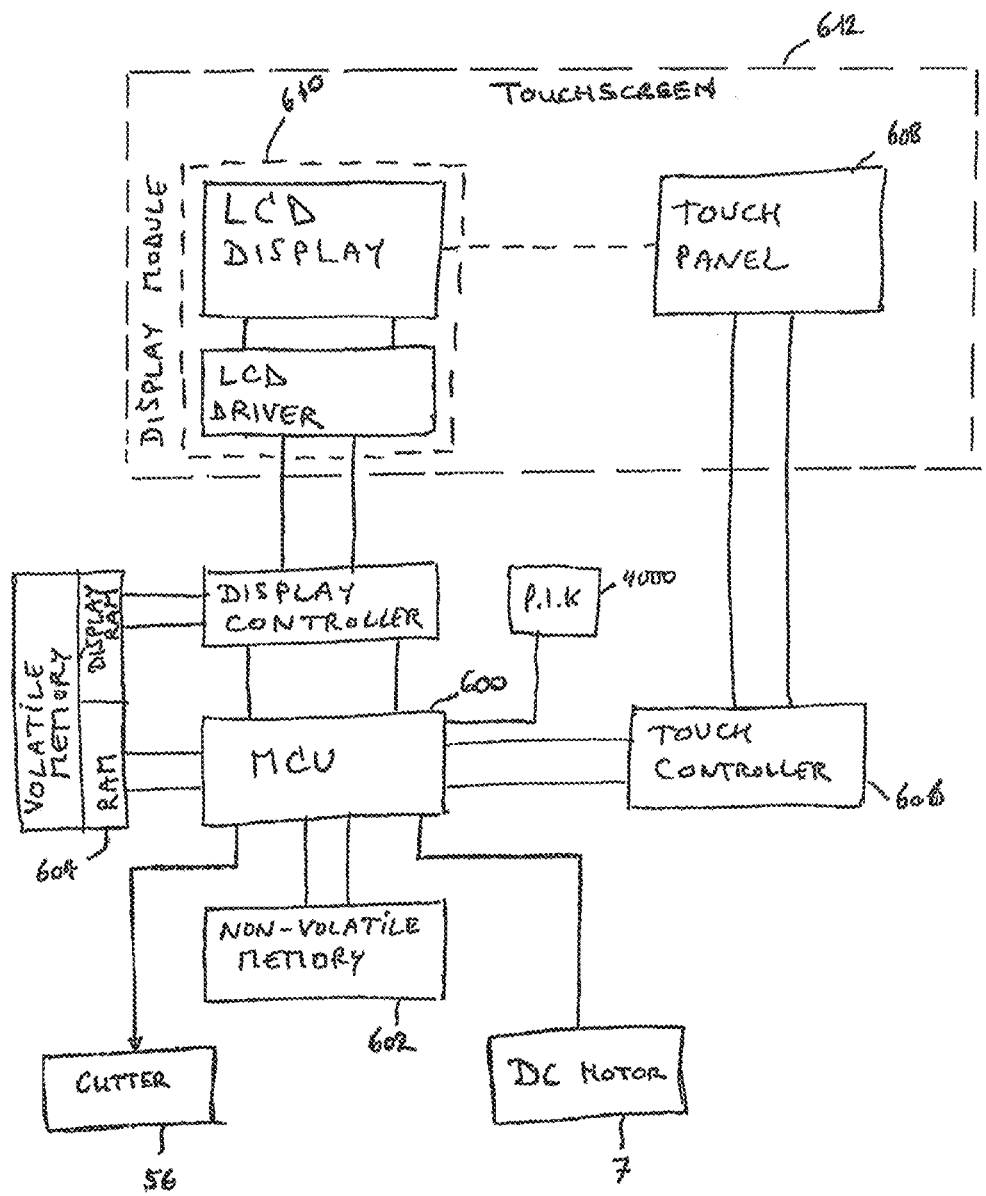
FIG. 3 is a schematic diagram of certain parts of a label printing system.

Basic circuitry for controlling the label printer 1 of FIG. 1 or the label printer 1' of FIG. 2 is shown in FIG. 3. There is a controller or "control means" (such as a micro controller unit (MCU) or processor) 600, a non-volatile memory 602 which is for example a read only memory (ROM) or a flash type of memory. The flash type of memory may be used in place of, or in addition to the read only memory. A volatile memory comprising a random access memory RAM 604 and/or display RAM is also provided. The MCU 600 is connected to receive label data input to it from a data input device such as a touch panel 608 of a touchscreen 612 via a touch panel controller 606. In alternative embodiments, the data input device may comprise one or more of a hardware keyboard including plural keys, a mouse, a digital pen or tracker ball, or any other means for enabling a user to send commands to the controller 600. In some embodiments, the touchscreen 612 is omitted. The MCU 600 outputs data to drive the display 610 (which together with the touch panel 608 form the touchscreen 612) to display a label to be printed (or a part thereof) and/or a message for the user. Additionally, the MCU 600 also outputs data to drive the print head 18 so that the label data is printed onto the image receiving tape to form a label. Finally, the MCU 600 also controls the motor 7 for driving the platen. The MCU 600 may also control the cutting mechanism 56 of FIG. 2 or a cutting mechanism of the device shown in FIG. 1 to allow a length of tape to be cut off. In alternative embodiments at least part of the cutting mechanism may be manually operated.

It should also be understood that where the label printer 1 or 1' is connected to an external apparatus such as a PC, then the PC also contains similar components such as at least one memory and at least one processor to enable the PC to carry out the operations of creating a label to be printed. Such a PC will also be connected to a display means such as a monitor.

Hereafter it should be understood that labels may be created on either or both of the label printing apparatus itself or on an external apparatus such as a PC connected to the label printer. Accordingly, it shall be understood that hereafter terms such as "memory", "processor" and "display" may refer to these components on either or both of a label printing apparatus and a PC.

Figure 4:
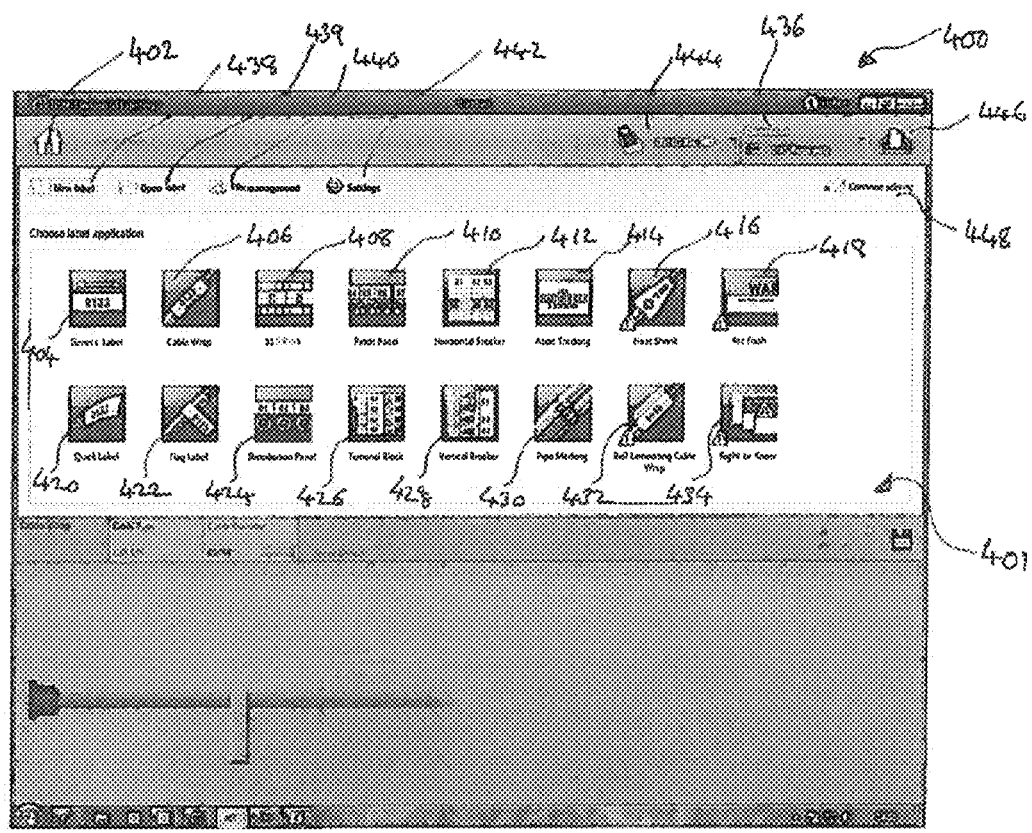
FIG. 4 shows a user interface according to an embodiment.

FIG. 4 generally shows a user interface 400 according to an embodiment. The user interface 400 may be presented on a monitor of a PC or on a display of a label printing apparatus. A user can navigate about the user interface 400 by known means. For example the user may operate a mouse or trackerball and can select options on the user interface 400 by placing a mouse pointer over an icon and clicking on that icon to select it. However it should also be appreciated that in other embodiments, for example where a touchscreen is used, the user may directly touch the screen or display so as to select icons and enter information. A user may also use a hardware keyboard or the like attached to a PC or directly attached to a label printer for navigating about the user interface.

In the embodiment of FIG. 4 a user has clicked on home icon 402, so that the user is now presented with home screen 401. This presents the user with a number of label types which may be selected by clicking on their respective icon. These label types include a general label 404, a cable wrap label 406, a 110-block label 408, a patch panel label 410, a horizontal breaker label 412, an asset tracking label 414, a heat shrink label 416, an arc flash label 418, a quick label 420, a flag label 422, a distribution panel label 424, a terminal block level 426, a vertical breaker label 428, a pipe marking label 430, a self-laminating cable wrap label 432, and a right-to-know label 434. It should be appreciated that further label types may also be displayed on the home screen 401.

The heat shrink label 416, arc flash label 418, self-laminating cable wrap label 432, and right-to-know label 434 are each displayed with an exclamation mark adjacent their icon. This informs the user that these label types are not available in the given context. For example it may not be possible to print these label types on the selected type of label material. The selected type of label material is shown at portion 436 of the user interface 400.

The label option types are presented to a user when they click on the "new label" icon 438. In the embodiment of FIG. 4 the "new label" screen also doubles as the home screen.

Other options are also available to a user via user interface 400. These include an "open label" icon 439. By clicking on this icon the user can open a previously saved label. By clicking on "file management" icon 440 the user enters a further interface where the user can manage their saved files, such as renaming the file and transferring the files to and from a label printer. The user can also access a settings menu via icon 442 for changing settings of the user interface. For example the user can change the language setting and whether to use imperial or metric units.

By clicking on icon 444 the user is presented with a drop down list of label printers. The type of label printer selected may for example determine the types of label that are available to a user and/or formatting options available.

Icon 446 is a "quick print" icon which enables a user to quickly print a currently displayed label by clicking on icon 446.

If a user is already in the process of preparing a label, and has exited the label editing screen for any reason, then they can quickly return to editing that label by clicking on "continue editing" icon 448.

Figure 5:
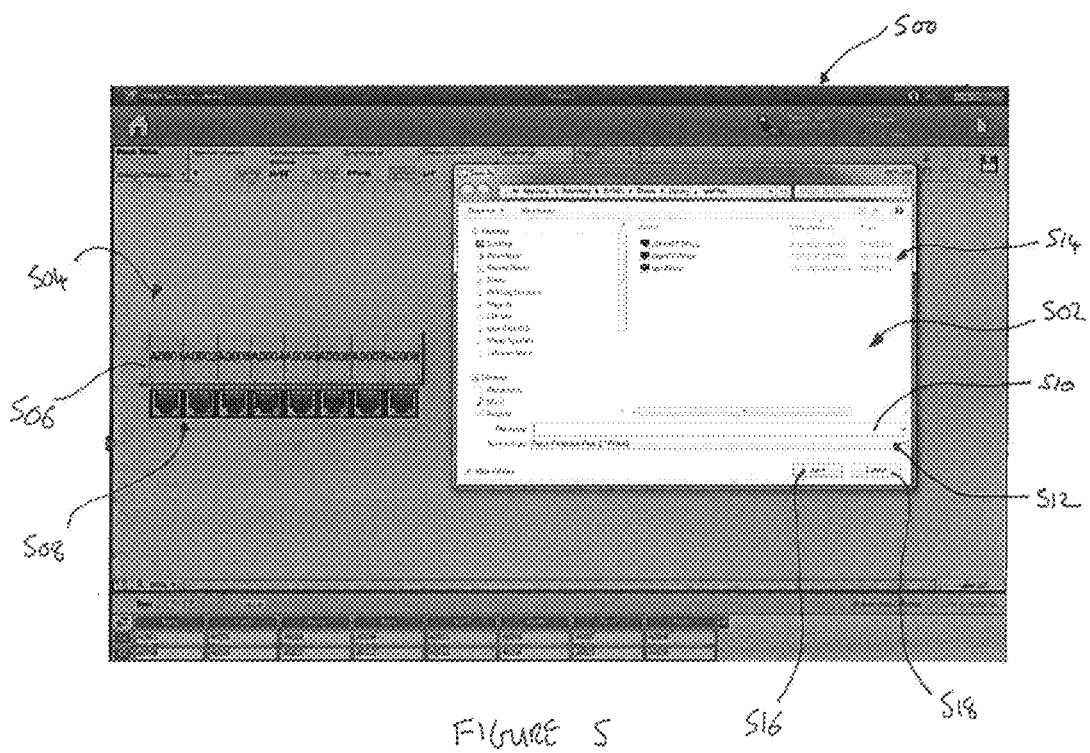
FIG. 5 shows a user interface according to a further embodiment.

FIG. 5 shows a user saving a label file according to an embodiment. The user interface 500 has been overlaid with a window 502 with which a user can save a created label. A label preview area 504 of the user interface is still visible, although it has been greyed out in order to highlight the saving window 502. It is nevertheless possible to see that the user has created a patch panel label 506, which is displayed adjacent a preview of patch panel 508.

The window 502 comprises a region 510 in which a user can enter a file name for the label to be saved. The window 502 also comprises a drop down menu 512 which enables a user to select the type of file to be saved. In some embodiments a detection is made as to which type of label has been prepared by a user, and the drop down menu automatically displays the detected label type. In the example of FIG. 5, it has been detected that a patch panel label has been prepared, and accordingly it has automatically selected a patch panel job file as the type of label to saved. Region 514 of window 502 displays to a user previously saved files of this type. It will be noted that each previously created label in this example has the same file extension name ".PPJOB". Once the user has filled in the file name in box 510 they can then save the label by clicking on icon 516. Alternatively the user can exit save window 502 by clicking on cancel button 518.

Figure 6:
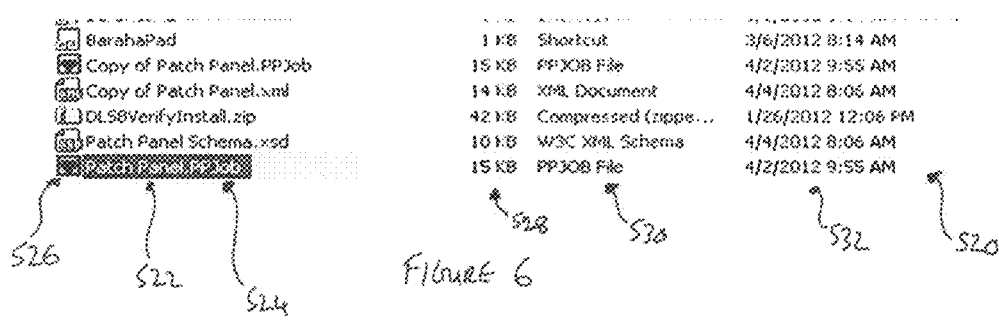
FIG. 6 shows a display of saved files according to an embodiment.

FIG. 6 shows in more detail a saved patch panel label file 520. The patch panel label file has been given the file name "patch panel" as shown at 522, and the file extension ".PPJOB" 524. Adjacent the filename 522 is provided an image icon 526 representative of a patch panel. Accordingly the user can easily see from the file name extension 524 and the image icon 526 that this saved label relates to a patch panel type of label. The size of the label file is also shown at 528, and the type of label file is again shown at 530. Date and time information of when the label file was saved is shown at 532.

It will of course be appreciated that other types of label can be saved in this manner, and that a patch panel label has been shown in FIGS. 5 and 6 by way of example only. The following table provides examples of label types and associated file extension names.

| Editor Name | File Extension |
|---|---|
| Patch Panel Editor | *.PPJob |
| General Editor | *.GenJob |
| 110 Block | *.110Job |
| Arc Flash | *.AFJob |
| Asset Tag | *.ATJob |
| Vertical Breaker | *.VBreakerJob |
| Distribution Panel | *.DistJob |
| Flag | *.FlagJob |
| Heat Shrink Tubing | *.HSTJob |
| Horizontal Breaker | *.HBreakerJob |
| Pipe Marking | *.PMJob |
| Quick Label | *.QuickJob |
| Right-to-know | *.RTKJob |
| Self Lam | *.SLJob |
| Terminal Block | *.TBJob |
| Wire Wrap | *.WrapJob |

In embodiments, when a user saves the label (for example by clicking on save icon 516 in FIG. 5), then the user may be provided with the option to save all the details of the label in the file or "job file". In some embodiments all of the details of the label will be automatically saved. For example the saved job file may save the following information:

Label application type e.g. patch panel, flag label etc

Label layout. For a patch panel label for example, the job file may contain the number of ports, the port to port distance and group clearance etc. For a general label that contains text placed at the top and bottom of the label, and a barcode in between for example, the saved job file will contain information related to the position of the text and barcodes.

Label data—all the data associated with the label will be saved. For a patch panel label the job file will contain the data associated with each port. The job file may also contain any "hard coded" text i.e. text that remains the same across multiple labels.

Label formatting—any formatting applied to the label objects e.g. text formatting like font size, bold, italics, underline, rotation, horizontal and vertical alignment etc.

Data mapping—where a data grid is supplied for enabling a user to map individual data grid cells to a label object then the job file will contain the mapping between the data grid and the label object.

Printer settings—collating sequence, mirrored settings, pause to cut, auto cut, number of labels etc.

Location of linked file, where the saved file has been linked to an external file.

Label auto fit settings—certain label editors may support label files that are saved with a certain cassette width and then opened in an editor or printer with a cassette selected that has a different tape width. If applicable, the labels may be resized based on the width of the selected cassette.

Cassette unique identifier—the cassette unique identifier identifies the specific cassette that the user has chosen. This allows the system to determine the size, colour and material used in the cassette when the job file is reopened.

Editor state—all the other parameters that are necessary to set the editor in the same state it was when the job file was saved.

As discussed above, when a job file is saved the system may apply a label application specific extension to the job file. For example a patch panel job has the extension ".PP JOB". This allows the system to match a job file to a specific label application. The user is also able to easily determine the type of label application just by looking at the icon for the file.

When a job file is open the job file is read and the label application may be recognised. The application will then automatically open the corresponding label application and populate the label editor with information from the saved job file.

In some embodiments the information in the job file is saved as an XML file. Accordingly a user can use any XML viewer to view the contents of the file. This may assist in making the job file compatible across multiple platforms or label printer types. For example the user may want to save the job file on their PC and also on one or more label printers. The job file makes it possible for the label file to be opened on any of these platforms in the manner in which the label was saved i.e. with the same label data and formatting etc. In embodiments the label and associated characteristics are presented in the same way across all platforms e.g. on a PC and multiple label printers. This enhances user friendliness since the user will become familiar with each label type and will not have to work in a different manner on the different platforms.

Embodiments may be particularly useful where the user creates and prints the same label multiple times. Instead of creating a new label every time, the user can open a saved label file and print the labels without having to go through the process of creating a label, formatting the label etc.

Some embodiments also provide a "link file" option which enables a user to link a saved label file with an external file. Accordingly changes made to the external file may be automatically copied across to the saved file, and vice versa. In other words the saved label file may be synchronised with an external file. This allows the user to maintain the data externally and for the system to automatically fetch current data from the linked file every time the job file is open.

Figure 7:
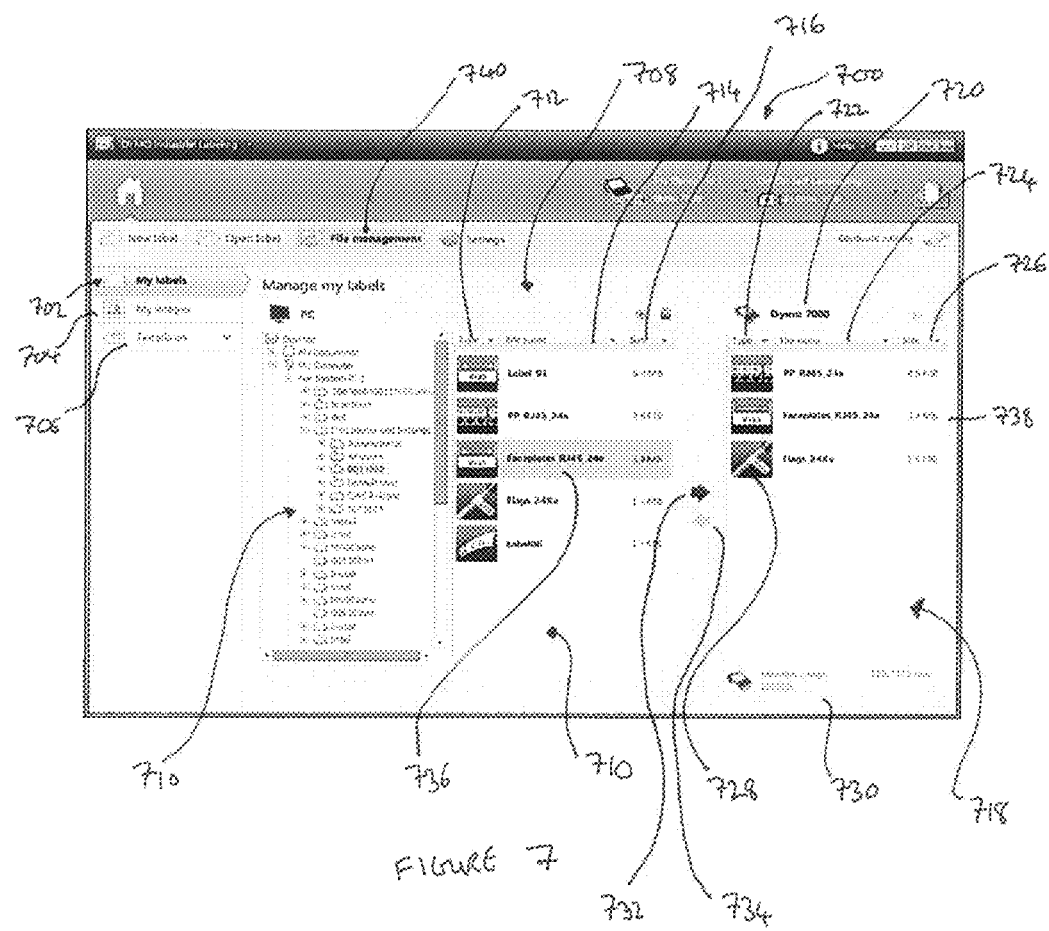
FIG. 7 shows a user interface according to a further embodiment.

FIG. 7 shows a user interface 700 as presented to a user following selection of file management icon 740. Using this feature a user can sort and organise their saved files. For example by clicking on icon 702 the user can view their saved labels. By clicking on icon 704 the user can view their saved images. By clicking on icon 706 a user can view their saved label templates. In the embodiment of FIG. 7 the user has selected icon 702 (i.e. "my labels"), as evidenced by the fact that this icon is highlighted.

This presents a user with a "Manage my labels" region of the user interface 708. Within region 708 is contained list 710 which lists directories on the user's PC. Adjacent list 710 there is displayed a region 712 which shows labels that have been saved on the user's PC. This region 710 includes a "type" column 712, a "filename" column 714, and a "size" column 716. The user can sort the labels by any of these headings i.e. type, file name, size.

Adjacent region 710 is a further region 718 which displays labels which have been saved on a label printer. In this case the labels have been saved on a "Dymo 7000" label printer, as shown at region 720. Similarly this portion of the user interface comprises a "type" column 722, a "filename" column 724, and a "size" column 726. The user can sort the labels by any of these headings.

In both regions 710 and 718 the type of label is also demonstrated by an image icon which enables a user to easily and quickly determine the type of label. For example the flag label in region 718 comprises an image of a flag label 728. The user interface 700 also provides a visual indication of the memory usage of the label printer, as shown at 730.

A user can transfer labels from the PC memory to the label printer memory and vice versa. To this end arrows 732 and 734 are provided. The arrow 732 points in a direction from the PC memory region 710 to the label printer memory region 718. In the embodiments of FIG. 7 a user has selected face plate label 736, and this label is highlighted in region 710. The arrow 732 has also been highlighted. Following selection of arrow 732 the faceplate label is transferred from the PC memory region 710 to the label printer memory region 718. The face plate label is shown at 738 in region 718. In some embodiments the transferring comprises copying the label from one region to another i.e. such that the label is then present in both regions. In other embodiments transferring the label comprises removing the label from one region and inserting it in the other region.

Labels can be transferred from the label printer region 700 to the PC region 710 in a similar manner. For example if a user selects one of the labels in the region 718, then the arrow 734 will become highlighted. If the user then selects arrow 734 that label will be transferred across to region 710.

It will of course be appreciated that the means shown in FIG. 7 for transferring labels is one example only, and that the labels can be transferred from PC to device, or from one device to another device in other ways. For example a user can drag-and-drop labels from one device to the other device by moving the labels between regions of the user interface. Alternatively a user may click on a label icon in a region corresponding to one device, and then a subsequent click in a region of the user interface associated with another device may cause that label to be transferred.

The way the user interface is displayed may also differ between embodiments. For example in FIG. 7 the labels saved on the label printer are shown horizontally adjacent the labels saved on the PC. In another embodiment the two regions may be vertically adjacent each other. The memory usage of the PC may also be displayed in other embodiments. The number of labels stored in each device may also differ from the number shown in FIG. 7. If a device has yet to have any labels saved in its memory, then the region of the user interface corresponding to that device may simply be left blank, or a message such as "no labels saved yet" may be displayed on the user interface in the appropriate region.

Figure 8:
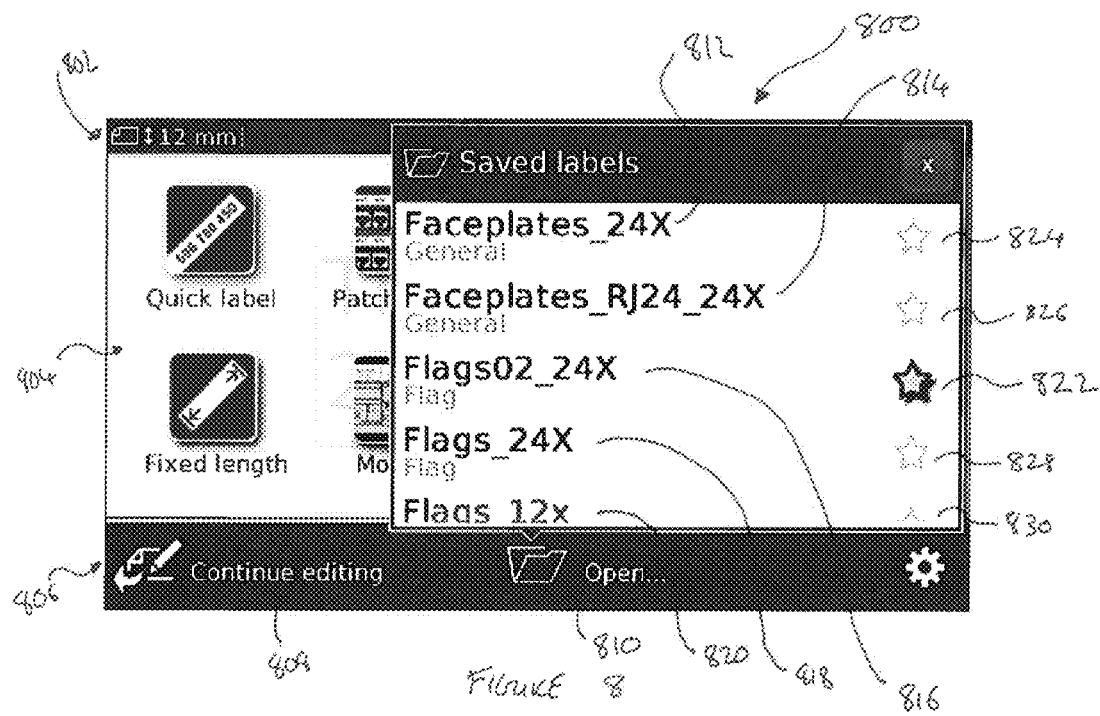
FIG. 8 shows a user interface according to a further embodiment.

Another feature available to a user in some embodiments comprises a "favourites" feature. This enables a user to mark their favourite or most preferred labels or label types. This is shown for example in FIGS. 8 and 9. In FIG. 8 a user interface 800 is displayed. The user interface comprises a header region 802, which displays to a user the width of tape in the associated cassette. In this case the tape is 12 mm wide. The user interface 800 further comprises a menu region 804, from where a user can select a number of label types to begin a label creation process. There is also provided a toolbar region 806 from which a user can select certain options. In the example of FIG. 8, the user is given a "continue editing" option 808, selection of which enables a user to move to an editing screen so that editing of a label can be continued.

Toolbar region 806 also comprises "Open . . . " icon 810. In the example of FIG. 8 the user has selected this icon 810 which has opened up a selection of saved labels. In this case the labels comprise faceplate labels 812 and 814, and flag labels 816, 818 and 820. Adjacent saved flag label 816 is a highlighted star icon 822. This indicates to a user that this is one of the user's favorite or most preferred labels. The label 816 has accordingly been centred in the list of saved labels, so that selection of this label is made easy for a user. Each of the other labels in the list comprises an outline of a star icon as shown at 824, 826, 828 and 830. However these stars are not highlighted, which indicates to a user that these are not the user's favourite or preferred labels.

Figure 9:
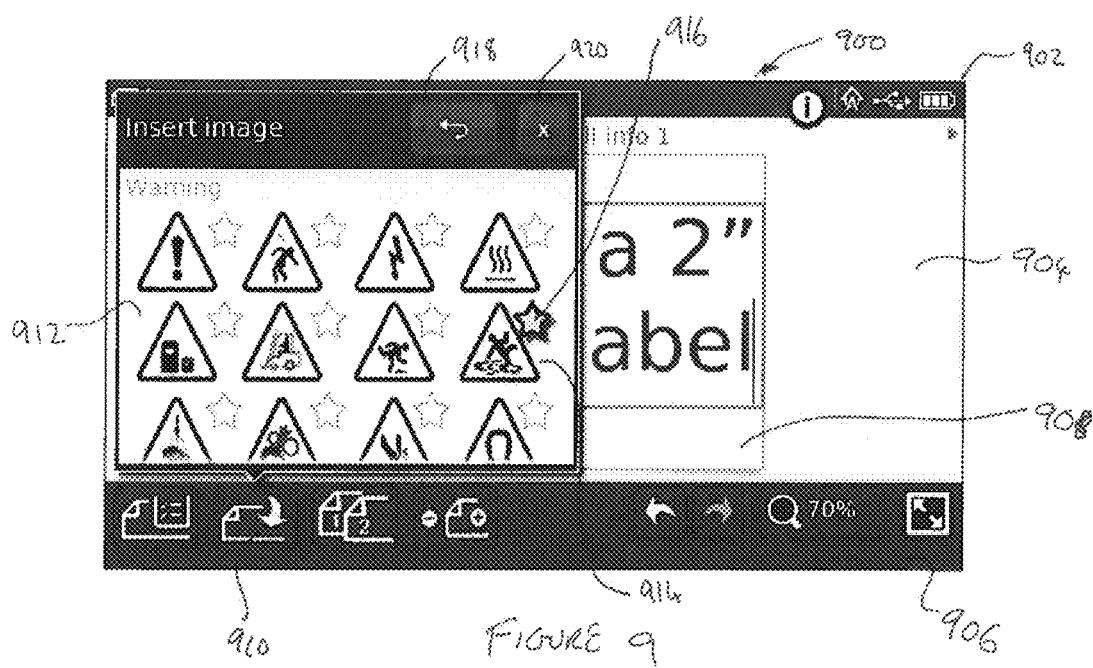
FIG. 9 shows a user interface according to a further embodiment.

FIG. 9 shows a similar embodiment in which a user can easily select their favourite or most preferred images to be inserted into a label image. In FIG. 9 the user interface 900 comprises a header region 902, a label preview region 904, and a toolbar region 906. The label preview region 904 comprises an end of a label to be printed 908.

The toolbar region 906 provides a user with a number of options. One of these options comprises a selectable icon 910, which when selected provides a user with a menu of images that can be inserted into the label image 908. The image options available to a user are shown in a menu 912. One of the images available to a user is a sign that warns a user of a slippery floor, as shown by image 914. Adjacent this image is a highlighted star icon 916 which shows to a user that this is one of their favourite or most preferred images. Each of the other images in the menu 912 comprise an outline of the star image, but the star is not highlighted. This displays to the user that these are non-preferred images.

A user can undo an action of inserting an image by clicking on undo icon 918. The user can also close down menu screen 912 by clicking on exit icon 920.

In these embodiments the user is able to quickly navigate to and select their favourite options or saved labels, which may speed up the process of label creation.

In embodiments a user can change the state of the "favorite star". For example a user could change the status of a highlighted favourites star to become non-highlighted to demonstrate that this is no longer a favoured option of the user. Likewise a non-highlighted favorite star could be highlighted by a user to show that this is now a favourite option of the user.

In some embodiments there is a separate "favorites" list where all favorite options are kept. Each time an option is made a "favourite" by a user then it is automatically transferred to the favorites list. A user can also remove options from the favourites list by deselecting that option.

The "favorite star" can be interacted with by selecting the star with a selector, or where the screen is a touchscreen by tapping on the star. For example, with reference to FIG. 8, if the non-highlighted star 824 is selected by a user, then the icon would become highlighted to show that this is now a favorite of the user. Likewise if the currently highlighted star 822 is selected or tapped by a user, then this star will become un-highlighted to show that it is no longer a favorite of the user.

It should of course be appreciated that the use of a star shape to represent a user's most preferred option is one example only, and that any other type of visual indicator may be used for this purpose. For example a different shape could be used for the favorites icon, or the option itself may have a differently colored background, or a flashing background etc.

Embodiments may provide an improved user interface which enhances user friendliness during a label creation process.

The skilled person would appreciate that any of the methods described herein may be implemented using a computer program embodied on a computer readable medium (such as a CDROM or memory within a stand-alone printer) for controlling a controller (or other similar apparatus as discussed above).

Embodiments may be used with continuous tape or die cut labels. Die cut labels are provided on a continuous backing layer but are discrete, pre-cut labels. The tape or die cut labels may be provided in a cassette or simply on a roll.

The foregoing merely illustrates the principles of certain embodiments. Modifications and alterations to the described embodiments will be apparent to those skilled in the art in view of the teaching herein. It will thus be appreciated that those skilled in the art would be able to devise numerous techniques which although not explicitly described herein, embody the principles of the described embodiments and are thus within the scope defined by the claims.

What is claimed is:

1. A method comprising:
receiving a selection of a type of label to be printed;
receiving information input for said label to be printed, wherein said information comprises label data defining content to be printed, and parameter data defining at least one parameter of the label to be printed;
providing a user with an option to save said information for said label with a label application specific extension file name indicative of the type of label from a plurality of available label application specific extension file names;
saving said information for said label to be printed as a file in a memory with said label application specific extension file name;
and making said saved label available for selection by said user with said label application specific extension file name.

2. The method as set forth in claim 1, wherein said method comprises transferring said file between a first device and a second device.

3. The method as set forth in claim 2, wherein said method comprises maintaining said label application specific extension file name when transferring said file between said first device and said second device.

4. The method as set forth in claim 2, wherein said method comprises causing said file to be opened on said second device, and displaying to a user an image of a label in accordance with said saved information.

5. The method as set forth in claim 1, wherein said first device comprises one of a label printer and a PC, and said second device comprises one of a label printer and a PC.

6. The method as set forth in claim 1, wherein the method comprises providing a user with an option to link data from an external file with said saved file.

7. The method as set forth in claim 6, wherein the method comprises synchronizing the external file data with the saved file data.

8. The method as set forth in claim 1, wherein said file is saved as an XML file.

9. The method as set forth in claim 1, wherein said type of label comprises one of: a general label; a cable wrap label; a 110-block label; a patch panel label; a horizontal breaker label; an asset tracking label; a heat shrink label; an arc flash label; a quick label; a flag label; a distribution panel label; a terminal block label; a vertical breaker label; a pipe marking label; a self-laminating cable wrap label; a right-to-know label.

10. The method as set forth in claim 1, wherein said label data comprises at least one of alphanumeric character data and bar-code data.

11. The method as set forth in claim 1, wherein said parameter information comprises one or more of: information regarding a specific cassette used; label layout information; print settings information; label formatting information.

12. A computer program comprising computer program code means stored on a non-transitory computer-readable medium adapted to perform the method according to claim 1 when said program is run on a computer.

13. A method as set forth in claim 1, wherein said providing a user with the option to save said label with a label application specific extension file name comprises providing a list of available label application specific extension file names.

14. A method as set forth in claim 1, wherein said providing a user with the option to save said label with a label application specific extension file name comprises automatically determining an appropriate label application specific extension file name.

15. An apparatus comprising:
at least one selector for enabling a user to select a type of label to be printed, and for enabling a user to input information for said label to be printed, wherein said information comprises label data defining content to be printed, and parameter data defining at least one parameter of the label to be printed;
the apparatus configured to provide a user with an option to save said information for said label with a label application specific extension file name indicative of the type of label from a plurality of available label application specific extension file names;
a memory for saving said information for said label to be printed with said label application specific extension file name;
and said apparatus configured to make said saved label available for selection by said user with said label application specific extension file name.

16. The apparatus as set forth in claim 15, wherein said apparatus is configured to transfer said file to a second device.

17. The apparatus as set forth in claim 16, wherein said apparatus is configured to maintain said label application specific extension file name when transferring said file between said first device and said second device.

18. The apparatus as set forth in claim 16, wherein said second device comprises a display, said second device configured to display to a user an image of a label in accordance with said saved information when said file is opened on said second device.

19. The apparatus as set forth in claim 15, wherein said apparatus comprises one of a label printer and a PC, and said second device comprises one of a label printer and a PC.

20. The apparatus as set forth in claim 15, wherein the apparatus is configured to provide a user with an option to link data from an external file with said saved file.

21. The apparatus as set forth in claim 20, wherein the apparatus is configured to synchronize the external file data with the saved file data.

22. The apparatus as set forth in claim 15, wherein said apparatus is configured to save said file as an XML file.

23. The apparatus as set forth in claim 15, wherein said type of label comprises one of: a general label; a cable wrap label; a 110-block label; a patch panel label; a horizontal breaker label; an asset tracking label; a heat shrink label; an arc flash label; a quick label; a flag label; a distribution panel label; a terminal block label; a vertical breaker label; a pipe marking label; a self-laminating cable wrap label; a right-to-know label.

24. The apparatus as set forth in claim 15, wherein said parameter information comprises one or more of: information regarding a specific cassette used; label layout information; print settings information; label formatting information.

25. The apparatus as set forth in claim 24, wherein said label layout information comprises information defining the relative positions of parts of the image to be printed.

26. The apparatus as set forth in claim 24, wherein said print settings information comprises one or more of collating sequence information; mirrored setting information; cutting information; number of labels.

27. The apparatus as set forth in claim 24, wherein said label formatting information comprises one or more of: font size; font style; horizontal alignment; vertical alignment.

* * * * *